Oct. 24, 1967  R. WEADOCK, JR  3,348,397
MAGNETIC FORMING APPARATUS
Filed Oct. 22, 1964

INVENTOR.
Richard Weadock, Jr.
BY
Hugh L. Fisher
ATTORNEY

United States Patent Office 3,348,397
Patented Oct. 24, 1967

3,348,397
MAGNETIC FORMING APPARATUS
Richard Weadock, Jr., Saginaw, Mich., assignor to General Motors Corporation, Detroit, Mich., a corporation of Delaware
Filed Oct. 22, 1964, Ser. No. 405,810
7 Claims. (Cl. 72—56)

ABSTRACT OF THE DISCLOSURE

Magnetic forming apparatus having a laminated flux concentrator and distributor that can be positioned within an annular working space defined by another flux concentrator or can be used alone. The flux concentrator and distributor has a series of slotted or C-shaped conductive plates, which are both axially aligned and electrically isolated from each other. The slots in each of the plates are angularly displaced from each other to distribute the discontinuities in the magnetic field from the slots.

---

This invention relates to improvements in apparatus for magnetically forming conductive workpieces.

The magnetic forming process for forming conductive material involves the application of a high intensity magnetic field to a workpiece so as to induce in the surface of the workpiece eddy currents. These induced eddy currents then interact with the magnetic field and result in a force that can be utilized to form the workpiece to some desired shape. As a part of the process and to render it more efficient a flux concentrator is customarily used to increase the intensity of the magnetic field. The typical flux concentrator is cylindrical in shape and has a radial slot therein. Inherently, the radial slot causes the magnetic field to be distorted and accordingly the surface of the workpiece; e.g., a bridge forms in the vicinity of the slot.

For the foregoing reason a novel arrangement is proposed for overcoming this problem by applying a substantial and uniform magnetic pressure at all points along the portion of the workpiece. More specifically, the invention contemplates a unique arrangement for distributing discontinuities in an intensified magnetic field within the working space between the workpiece and the flux concentrator so as to negate the influence thereof on the final formed shape of the workpiece.

The foregoing and other objects and advantages of the invention will become apparent from the following description and the accompanying drawings, in which.

Figure 1:
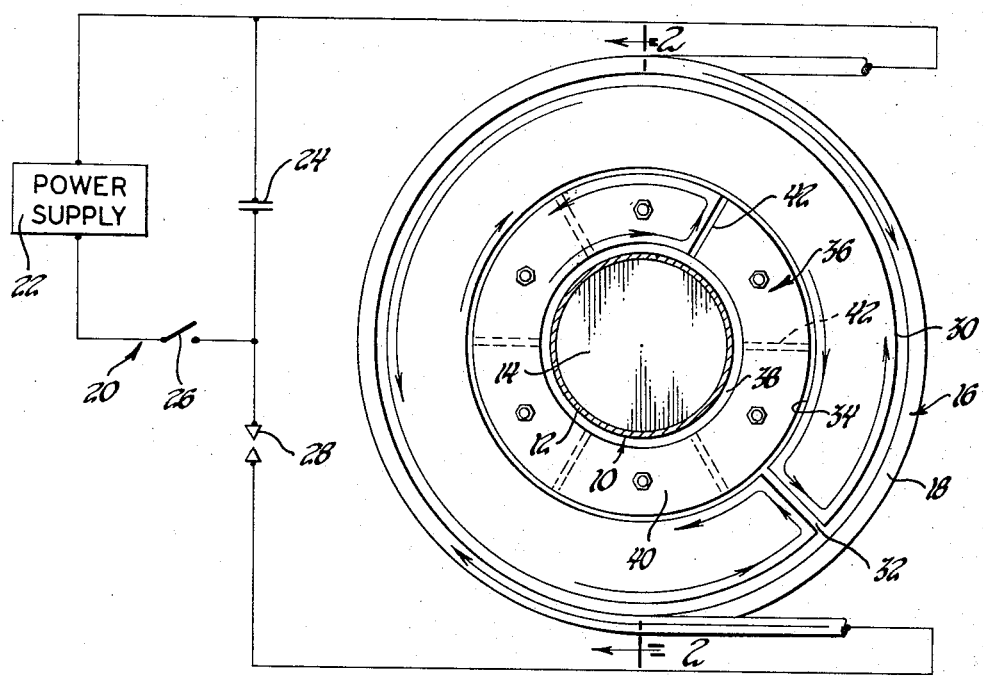
FIGURE 1 illustrates apparatus incorporating the principles of the invention.

Considering now the drawings in detail, the numeral 10 shows generally a workpiece formed in two parts; a female part 12 and a male part 14 to be joined at their ends by the magnetic forming process. In a way to be explained, a magnetic force is generated by the apparatus viewed generally at 16 such that the female part 12 is collapsed or compressed onto the exterior of the male part 14.

The apparatus 16 employs a conductor in the form of a helically wound coil 18. The opposite ends of this coil 18 are connected to a high amperage pulse source shown generally at 20. The prime requisite of the source 20, which is of the capacitive type, is that it must provide a high rate of change of current with respect to time so that a corresponding high rate of change of flux versus time is developed by the coil 18. This prevents the magnetic field from penetrating too far into the surface of the workpiece 10. If this were permitted, the net forming force would become minimal since the magnetic pressure will ultimately, as the penetration depth increases, be balanced by the opposing internal pressure from the workpiece.

The displayed source 20 includes a high voltage power supply 22, a capacitor bank 24, a switch 26 and a spark gap 28. In place of the capacitor bank 24 a motor-generator set or other suitable pulse source may be used, while the spark gap 28 can be replaced by some other kind of a similarly performing switch, such as a thyratron or an ignitron. Operationally, when the switch 26 is closed, current at the voltage of the power supply 22, e.g., 10 kv., is supplied to the capacitor bank 24. With the capacitor bank 24 in parallel with the power supply 22 the charge thereon will build up to some predetermined voltage sufficient to break down the spark gap 28. A current pulse of a high amperage, e.g., 100,000 amperes, is then supplied to the coil 18. The pulse has a duration of only a few microseconds so that the coil 18 will develop a substantial magnetomotive force and accordingly a very high intensity magnetic field. The resultant magnetic pressure will urge any workpiece in the vicinity of this field away from the coil 18 and thus afford the desired forming force provided the workpiece is appropriately held.

To concentrate the flux on the area of the workpiece 10 defined by the ends of the female and male portions 12 and 14, a flux concentrator 30 of the generally cylindrical configuration illustrated is employed. The flux concentrator 30 is formed of some highly conductive material, such as copper, and has a radial slot at 32, as viewed in FIGURE 1. The energization of the coil 18 by the source 20 will cause the current to follow the path of the arrows shown in FIGURE 1 and induce in the periphery of the flux concentrator 30 a secondary current having the direction also shown by arrows. In effect, the coil 18 serves as a multiturn primary and the flux concentrator 30 as a single turn secondary. As a consequence, there is a step-down in the voltage and an increase in the current. With the current proceeding in the direction of the arrows in FIGURE 1 it will be appreciated that along the inner diameter of the flux concentrator 30, identified by the numeral 34, there will be a concentration of the current within a smaller area such that the current density in this reduced area is substantially greater. This concentration, therefore, produces a much more intense magnetic field that can be concentrated as wanted on a very small part or portion of a workpiece.

As can be appreciated, without the slot 32 the flux concentrator 30 would become the workpiece. Consequently, there would be little or no forming of the actual workpiece 10.

An examination of FIGURE 1 and the alignment of the radial slot 32 in the flux concentrator 30 will demonstrate the problem of obtaining uniform distribution of the magnetic pressures on the workpiece 10; for, as will be appreciated, there will be a discontinuity in the magnetic field at the slot 32. In actual practice this discontinuity will cause a bulge to develop in the workpiece surface adjacent the slot 32. This is because of the reduction in the forming force in this area. For this reason a unique flux concentrator and distributor, denoted by the numeral 36, is interposed between the inside diameter 34 of the flux concentrator 30 and the workpiece 10, and so aligned as to define an annular working space at 38. The flux concentrator and distributor 36 is of laminated structure comprising a series of rings or plates 40 of a highly conductive material; e.g., copper. Each plate 40 is appropriately insulated from the other and each is provided with a radial slot 42. These radial slots 42 are all circumferentially displaced from each other, as viewed in FIGURE 1. The entire assemblage is preferably encapsulated with a very well known "potting" material. Thus, there is a current induced in the laminated flux concentrator and distributor 36 by the current in the flux concentrator 30, keeping in mind that each individual plate 40 serves as a separate flux concentrator in the same way as the flux concentrator 30. This induced current will proceed in the opposite direction of the arrows shown on the inside part of the plates 40 in FIGURE 1 and develop a magnetic pressure within the working space 38 for forming the workpiece 10. The working space 38 affords a relatively narrow air gap in which a high flux density is produced. Consequently, high currents are induced in the mentioned direction in the surface of the workpiece 10. The workpiece 10, in effect, represents a short-circuited transformer secondary. It is the resultant magnetic force that collapses part 12 onto the part 14. An equal and opposite force is exerted on the coil 18, which may be maintained stationary by an appropriate confinement (not shown) in any well known way.

By having the slots 42 in random disposition relative to each other the tendency for the magnetic field generated finally by the induced current in the laminated flux distributor plates 40 to be distorted is virtually eliminated as long as the thickness of the plates 40 is small compared to the width of the part being formed. Since field distortion is negligible, the tendency for the workpiece 10 to be misformed or misshaped in the vicinity of the slots is for all practical purposes eliminated.

With this flux concentrator and distributor 36 not only is a greater current density achieved, the internal surface of the flux concentrator and distributor 36 being smaller than that of the concentrator 30, but also the resultant magnetic pressures acting within the working space 38 on the workpiece 10 are equally distributed. This is important when it is considered that a magnetic field within the working space 38, by way of example only, of 500,000 gauss is developed.

It is contemplated that in some applications of the process the flux concentrator and distributor 36 may afford adequate flux concentration. Therefore, flux concentrator 30 can be eliminated. This arrangement will be as illustrated in FIGURE 3.

Figure 2:
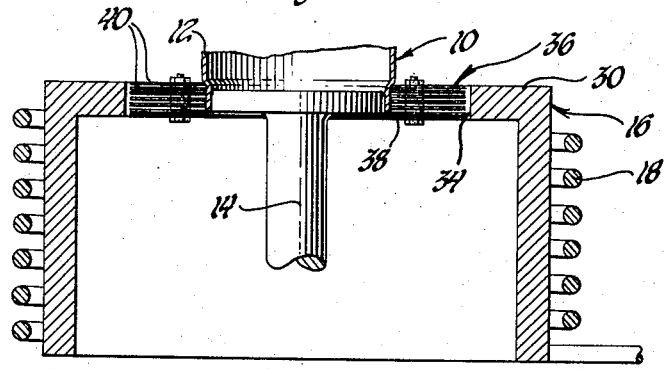
FIGURE 2 is a sectional view of the apparatus taken along the line 2—2 of FIGURE 1.
Figure 3:
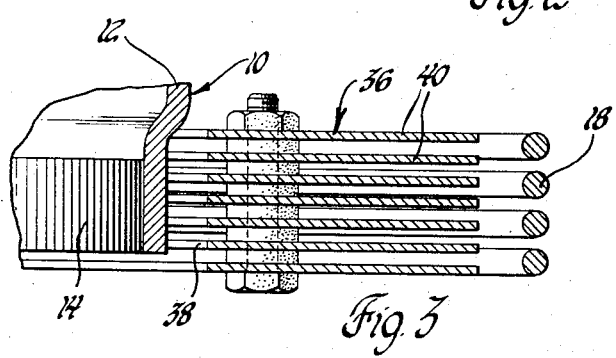
FIGURE 3 is a sectional view of a modification of the apparatus.

The embodiments of FIGURES 1, 2 and 3 show external forming of a workpiece 10. The same principles, as will be well understood by those versed in the art, can be employed to internally form a workpiece.

The invention is to be limited only by the following claims.

What is claimed is:

1. Apparatus for magnetically forming a metallic workpiece comprising a conductor of predetermined shape, means energizing the conductor so as to develop a certain magnetomotive force for establishing a magnetic field, and laminated flux concentration and distributing means increasing the magnetic intensity of the field and also distributing discontinuities in the field within a working space adjacent the workpiece so as to develop a uniform magnetic pressure for forming the workpiece, the laminations each having a current interrupting slot therein, the slots being angularly displaced from each other.

2. Apparatus for magnetically forming a metallic workpiece comprising a conductor of predetermined shape, means energizing the conductor so as to develop a certain magnetomotive force for establishing a corresponding magnetic field, and means increasing and distributing the magnetic field so as to develop a relatively uniform magnetic pressure for forming the workpiece, the latter means including a flux concentrator and distributor so arranged relative to the conductor and the workpiece as to increase the density of the current induced therein by the energization of the conductor and accordingly the intensity of the magnetic field within a working space adjacent the workpiece, the flux concentrator and distributor having a series of electrically isolated and axially aligned conductive members, each being slotted at angularly displaced points from the other so as to distribute discontinuities in the magnetic field within the working space.

3. Apparatus for magnetically forming a metallic workpiece comprising, in combination, a conductor of predetermined shape, means energizing the conductor so as to develop a certain magnetomotive force for establishing a magnetic field, and means increasing and distributing the magnetic field so as to develop a relatively uniform magnetic pressure for forming the workpiece, the latter means including a flux concentrator and distributor having a series of spaced and axially aligned conductive members, each being insulated from the other and each having a radial slot, the radial slots being angularly displaced from each other.

4. Apparatus for magnetically forming a metallic workpiece comprising, in combination, a conductor of a predetermined shape, means energizing the conductor so as to develop a certain magnetomotive force for establishing a magnetic field, and means increasing and distributing the magnetic field so as to develop a relatively uniform magnetic pressure for forming the workpiece, the latter means including a flux concentrator and distributor cooperating with the conductor to define a working space of a certain shape for receiving the workpiece and including a series of electrically insulated annular plates each being formed with a radial slot at different circumferential locations so as to establish the relatively uniform and intensified magnetic field within the working space for forming the workpiece when the conductor is energized.

5. Apparatus for magnetically forming a metallic workpiece comprising, in combination, a conductor of a predetermined shape, means energizing the conductor so as to develop a certain magnetomotive force for establishing a magnetic field, and means increasing and distributing the magnetic field including a flux concentrator so arranged relative to the conductor as to have a current induced therein when the conductor is energized and so shaped as to increase the density of the current induced therein, and a flux concentrator and distributor interposed between the workpiece and the flux concentrator and so aligned relative to the workpiece as to define a working space therebetween, the flux concentrator and distributor having a series of spaced and axially aligned annular members of conductive material, each member having a radial slot, the member being insulatingly joined so that the radial slots are angularly displaced from each other thereby increasing the density of the current induced therein by the current induced in the flux concentrator and accordingly the magnetic intensity of the field as well as distributing discontinuities therein within the working space so as to exert a relatively uniform forming pressure on the workpiece.

6. Apparatus for magnetically forming a metallic workpiece comprising, in combination, a conductor of annular configuration, means energizing the conductor so as to develop a certain magnetomotive force for establishing a magnetic field, and means increasing and distributing the magnetic field, the latter means including a cylindrical flux concentrator having a radial slot therein, the flux concentrator being so positioned relative to the conductor as to have a current induced therein when the conductor is energized; a flux concentrator and distributor interposed between the flux concentrator and the workpiece and so aligned relative to the workpiece as to define a working space and so aligned relative to the flux concentrator as to have a current induced therein by the current induced in the flux concentrator thereby developing a magnetic field within the working space, the flux concentrator and distributor having a series of spaced and axially aligned annular plates of conductive material, each plate having a radial slot, the plates being insulatingly joined together so that the radial slots are each annularly displaced from each other thereby distributing discontinuities in the magnetic field within the working space, the flux concentrator and distributor coacting when the conductor is energized to develop a relatively uniform and intensified magnetic pressure within the working space for forming the workpiece.

7. Apparatus for magnetically forming a metallic workpiece comprising, in combination, a coil, a capacitor, a switch operative to connect the capacitor to the coil, a high voltage source, and means for connecting the high voltage source across the capacitor so as to charge the capacitor and subsequently energize the coil when the switch is operated thereby developing a certain magnetomotive force for developing a corresponding magnetic field, and means concentrating the magnetic field including a flux concentrator of cylindrical configuration and having a radial slot therein, the flux concentrator being arranged within the coil in coaxial relationship therewith, a flux concentrator and distributor arranged within the flux concentrator and in coaxial relation therewith, the flux concentrator and distributor surrounding the workpiece and so aligned therewith as to define a working space, the flux concentrator and distributor including a series of magnetically insulated annular plates each being formed with a radial slot at different circumferential locations so as to establish a relatively uniform and intensified magnetic field within the working space for forming the workpiece when the coil is energized.

References Cited
UNITED STATES PATENTS

| | | | |
|---|---|---|---|
| 3,126,937 | 3/1964 | Brower et al. | 72—56 |
| 3,252,313 | 5/1966 | Eilers et al. | 72—56 |

RICHARD J. HERBST, *Primary Examiner.*